(12) United States Patent
Lee et al.

(10) Patent No.: US 10,086,827 B2
(45) Date of Patent: Oct. 2, 2018

(54) APPARATUS AND METHOD FOR CONTROLLING DRIVING MODE OF HYBRID ELECTRIC VEHICLE

(71) Applicants: Hyundai Motor Company, Seoul (KR); Kia Motors Corporation, Seoul (KR)

(72) Inventors: Chun Hyuk Lee, Gyeonggi-do (KR); Jang Hyo Lee, Gyeonggi-do (KR); Seong Ik Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 316 days.

(21) Appl. No.: 14/960,359

(22) Filed: Dec. 5, 2015

(65) Prior Publication Data

US 2017/0057488 A1 Mar. 2, 2017

(30) Foreign Application Priority Data

Sep. 2, 2015 (KR) .................. 10-2015-0124481

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/48* (2013.01); *B60W 10/02* (2013.01); *B60W 20/20* (2013.01);
(Continued)

(58) Field of Classification Search
None
See application file for complete search history.

(56) References Cited

U.S. PATENT DOCUMENTS 8,731,761 B2 * 5/2014 Yamagata ................ B60K 6/48
701/22
2009/0143950 A1 * 6/2009 Hasegawa ................ B60K 6/48
701/68
(Continued)

FOREIGN PATENT DOCUMENTS

| JP | 2005-299844 A | 10/2005 |
| JP | 2007-069789 A | 3/2007 |
| JP | 2010-139004 A | 6/2010 |
| JP | 2013-119273 A | 6/2013 |
| JP | 2014-234133 A | 12/2014 |
| JP | 2014234133 A * | 12/2014 |

(Continued)

*Primary Examiner* — Shelley Chen
(74) *Attorney, Agent, or Firm* — Mintz Levin Cohn Ferris Glovsky and Popeo, P.C.; Peter F. Corless

(57) ABSTRACT

An apparatus and a method for controlling a driving mode of an HEV are provided. The apparatus releases an HEV mode at an appropriate time before forcibly releasing an engine clutch even when an accelerator pedal is engaged while driving the vehicle on an uphill road in the HEV mode to reduce a shock caused when the engine clutch is forcibly disengaged and improve riding comfort and drivability. The method includes determining whether the vehicle is driven on an uphill road from gradient information of a current road while the vehicle is driven in a HEV mode and determining a clutch engagement impossible speed corresponding to the gradient of the current road when the vehicle is driven on the uphill road. The engine clutch is disengaged to release the HEV mode when the speed of the motor is equal to or less than the determined clutch engagement impossible speed.

16 Claims, 2 Drawing Sheets

(51) Int. Cl.
- B60W 10/02 (2006.01)
- B60W 20/20 (2016.01)
- B60K 6/387 (2007.10)
- B60W 20/00 (2016.01)

(52) U.S. Cl.
CPC ...... *B60K 6/387* (2013.01); *B60K 2006/4825* (2013.01); *B60W 20/00* (2013.01); *B60W 2510/0216* (2013.01); *B60W 2510/081* (2013.01); *B60W 2540/10* (2013.01); *B60W 2550/142* (2013.01); *B60W 2710/02* (2013.01); *B60W 2710/021* (2013.01); *B60Y 2200/92* (2013.01); *B60Y 2300/182* (2013.01); *Y02T 10/6221* (2013.01); *Y02T 10/6252* (2013.01); *Y10S 903/946* (2013.01)

(56) References Cited

U.S. PATENT DOCUMENTS

| | | | |
|---|---|---|---|
| 2012/0203406 A1* | 8/2012 | Akebono | B60W 10/02 701/22 |
| 2013/0274980 A1* | 10/2013 | Takamura | B60K 6/48 701/22 |
| 2014/0297087 A1* | 10/2014 | Amano | B60L 11/123 701/22 |
| 2015/0210266 A1* | 7/2015 | Yang | B60K 6/387 701/22 |

FOREIGN PATENT DOCUMENTS

| | | |
|---|---|---|
| KR | 10-2013-0066160 A | 6/2013 |
| KR | 2014-0056507 A | 5/2014 |

* cited by examiner

APPARATUS AND METHOD FOR CONTROLLING DRIVING MODE OF HYBRID ELECTRIC VEHICLE

CROSS-REFERENCE TO RELATED APPLICATION

This application claims under 35 U.S.C. § 119(a) the benefit of Korean Patent Application No. 10-2015-0124481 filed on Sep. 2, 2015, the entire contents of which are incorporated herein by reference.

BACKGROUND (a) Technical Field

The present invention relates to an apparatus and a method for controlling a driving mode of a hybrid electric vehicle (HEV). More particularly, the present invention relates to an apparatus and a method for controlling a driving mode of a hybrid electric vehicle which release an HEV mode at an appropriate time before forcibly releasing an engine clutch even when an accelerator pedal is engaged while driving the vehicle on an uphill road in the HEV mode, thereby reducing a shock or jerk caused when the engine clutch is forcibly disengaged and improving riding comfort and drivability.

(b) Background Art

Generally, a hybrid vehicle is a type of vehicle driven using an internal combustion engine (ICE) which uses a fossil fuel and a motor which uses electric energy as driving sources and is a type of eco-friendly vehicle which uses both the energy of the fossil fuel and the electric energy while being driven, to reduce exhaust gas and improve fuel efficiency. As a power train of the hybrid vehicle, a transmission mounted electric device (TMED) type in which a motor for driving the vehicle is disposed within a transmission is well known. In the general TMED type, the transmission is disposed at an output side of the motor and an engine clutch is disposed between the engine and the motor and thus, when the engine clutch is coupled to the engine and the motor, power of the engine and the motor is transmitted to a driving wheel through the transmission.

FIG. 1 is a view illustrating a configuration of a power train of a hybrid vehicle according to the related art and illustrates a configuration of a TMED type power train in which a motor is attached on a transmission. As illustrated in FIG. 1, a configuration of a TMED type power train includes an engine 1 and a motor 3 disposed in series as driving sources for driving a vehicle, an engine clutch 2 disposed to selectively connect or disconnect power between the engine 1 and the motor 3, a transmission 4 which changes power of the engine 1 and the motor 3 to output the power to the driving wheel, and a hybrid starter and generator ("HSG") 5 connected to the engine 1 to transmit the power.

The engine clutch 2 connects or disconnects power between two driving sources which drive the vehicle, that is, the engine 1 and the motor 3 through selective operation of coupling and releasing operation. As is well known in the related art, when the hybrid vehicle is driven in an electric vehicle (EV) mode, the engine clutch 2 is separated to drive the vehicle using the power of the motor 3 and when the hybrid vehicle is driven in a hybrid electric vehicle (HEV) mode, the engine clutch 2 is coupled to drive the vehicle using the power of the engine 1 and the motor 3.

While a vehicle brakes (e.g., the brake pedal is engaged) or coasts by inertia, the motor 3 operates as a generator to perform an energy recovery mode in which a battery 7 is charged. The battery 7 which is a power source (e.g., an electric power source) of the vehicle is connected to the motor of the vehicle, that is, the motor 3 and the HSG 5 via an inverter 6 to be charged or discharged. In particular, the inverter 6 is configured to convert a direct current of the battery 7 into a three phase alternative current (AC) to apply the current to the motor 3 and the HSG 5, thereby driving the motor 3 and the HSG 5.

The HSG 5 is a device configured to perform a combined function of a starting motor and a generator in the hybrid vehicle and is driven as a motor using battery power when an engine is started to transmit the power to the engine 1 using power transmission equipment, such as a belt and a pulley, and is configured to operate as a generator by a rotational force transmitted from the engine 1 when electricity is generated, to thus charge the battery 7. In the meantime, in an area where high power is required, such as a highway or an uphill road, the hybrid vehicle is driven in the HEV mode which uses engine power and motor power and uses the engine power even when a state of charge (SOC) of a high voltage main battery is insufficient to secure SOC balancing while maintaining an appropriate SOC.

The TMED type hybrid vehicle equipped with an automatic transmission (e.g., a six speed transmission) applies a high torque based on fuel efficiency and the state of charge (SOC) balance after starting an engine, which is different from a general gasoline vehicle. Specifically, when a system does not include a torque converter, a high torque should be applied at all times. In particular, due to a characteristic of the engine, precision for controlling a torque is reduced at a low speed (e.g., low revolutions per minute, RPM) and when a high torque is applied at a low speed, noise, vibration, and harshness (NVH) performance deteriorates.

When the accelerator pedal is engaged with a minimal pedal amount (e.g., opening degree, minimal pressure is exerted onto the pedal) on an uphill road with a high driving load to drive the vehicle using the engine power through the HEV mode, a louder booming noise may be output and a substantial vibration of the engine may be experienced compared to the manipulation of a greater pedal opening degree (e.g., when more pressure is exerted onto the pedal). However, since the accelerator pedal is continuously engaged, an engine off condition is not satisfied, and the HEV mode is maintained.

In other words, when pressure is continuously exerted onto the accelerator pedal in the uphill section, a driver continuously requires the power, and thus the vehicle is maintained to be driven in the HEV mode. In summary, when the vehicle is driven on the uphill road, the engine power is used to maintain an appropriate SOC of the high voltage main battery and secure the SOC balancing even though the vehicle is driven with a minimal accelerator pedal amount and when the driver maintains the manipulation state of the accelerator pedal in the driving mode, the HEV mode is not released.

However, when an engine speed and a motor speed are reduced together with the vehicle speed due to the uphill driving where the vehicle enters a speed (RPM) area at which the HEV mode may not be maintained, an engine clutch is forcibly disengaged to prevent engine stall. While the HEV mode driving is performed with a minimal accelerator pedal amount on the uphill road, the vehicle speed should be rapidly decreased compared to flat road driving or downhill driving.

The rapid reduction in the vehicle speed, that is, a wheel speed of the vehicle means that the engine speed and the motor speed are rapidly decreased. In particular, when the speed reaches the low speed area where the HEV mode is not maintained, the engine clutch is operated to be forcibly disengaged, instead of normal clutch releasing sequence in which the engine clutch is completely disengaged after hydraulic disengagement.

As described above, when engagement of the engine clutch is forcibly disengaged to a state in which a hydraulic pressure is applied to the engine clutch to couple the engine torque and the clutch without having a normal control process for releasing an HEV mode, a vibration phenomenon such as shock or jerk (e.g., instant sudden movement) is generated together with the vibration of a driving shaft, which may lower drivability.

In the related art, a control strategy which releases the HEV mode at an appropriate time before a forcible releasing condition of the engine clutch in an uphill driving, an HEV mode driving, and an accelerator manipulation maintaining state is absent, increasing concern regarding a shock and jerk on the uphill road which connects levels of parking lots or an uphill congestion section in the city.

The above information disclosed in this section is merely for enhancement of understanding of the background of the invention and therefore it may contain information that does not form the prior art that is already known in this country to a person of ordinary skill in the art.

SUMMARY

The present invention provides an apparatus and a method for controlling a driving mode of a hybrid electric vehicle which release a hybrid electric vehicle (HEV) mode at an appropriate time before forcibly releasing an engine clutch even when an accelerator pedal is continuously engaged while driving the vehicle on an uphill road in the HEV mode, thereby solving problems of a shock or jerk caused when the engine clutch is forcibly disengaged and resultant problems of lowering riding comfort and drivability.

In one aspect, the present invention provides a driving mode control method of a hybrid vehicle which includes an engine and a motor which drive a vehicle and an engine clutch which connects or disconnects the power between the engine and the motor, the method may include: determining whether the vehicle is driven on an uphill road from gradient information (e.g., slope information) of a current road while the vehicle is driven in a hybrid electric vehicle mode; determining a clutch engagement impossible speed that corresponds to the gradient of the current road in response to determining that the vehicle is driven on the uphill road; and disengaging the engine clutch to release the HEV mode when the speed of the motor is equal to or less than the determined clutch engagement impossible speed.

In another aspect, the present invention provides a driving mode control apparatus of a hybrid vehicle which includes an engine and a motor which drive a vehicle and an engine clutch which connects or disconnects the power between the engine and the motor, the apparatus may include: a gradient detecting unit configured to detect a gradient of a road on which a vehicle is driven; a motor speed detecting unit configured to detect a speed of the motor; and a controller configured to release or maintain the HEV mode control based on the speed of the motor detected by the motor speed detecting unit in response to determining that the vehicle is driven on the uphill road from gradient information of the road detected by the gradient detecting unit during an HEV mode driving of a vehicle, in which the controller, during uphill road driving of the vehicle, may be configured to determine a clutch engagement impossible speed that corresponds to the gradient of a current road and when the speed of the motor is equal to or less than the determined clutch engagement impossible speed, disengage the engine clutch to release the HEV mode.

Therefore, according to the apparatus and the method for controlling a driving mode of a hybrid vehicle, even though driver demanded power does not reach a reference power line value or the accelerator pedal is engaged while driving the vehicle on an uphill road in an HEV mode, when a motor speed is equal to or less than a clutch engagement impossible speed, HEV mode releasing control and HSG generation control may be performed simultaneously to prevent the power of the engine from being transmitted to a driving shaft and to use the power of the engine for HSG generation.

As a result, according to the present invention, before reaching the forcible releasing condition of the engine clutch, HEV mode release which follows a normal clutch releasing sequence in which the engine clutch may be completely disengaged after disengaging an applied hydraulic pressure is performed, to reduce a shock and a jerk caused when the engine clutch is forcibly disengaged and improve the riding comfort and drivability of the vehicle.

According to the present invention, the HSG generation control may be performed when the HEV mode is released, and thus the engine power may be used for HSG generation and battery charging to maintain an appropriate SOC of the battery and securing the SOC balancing.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
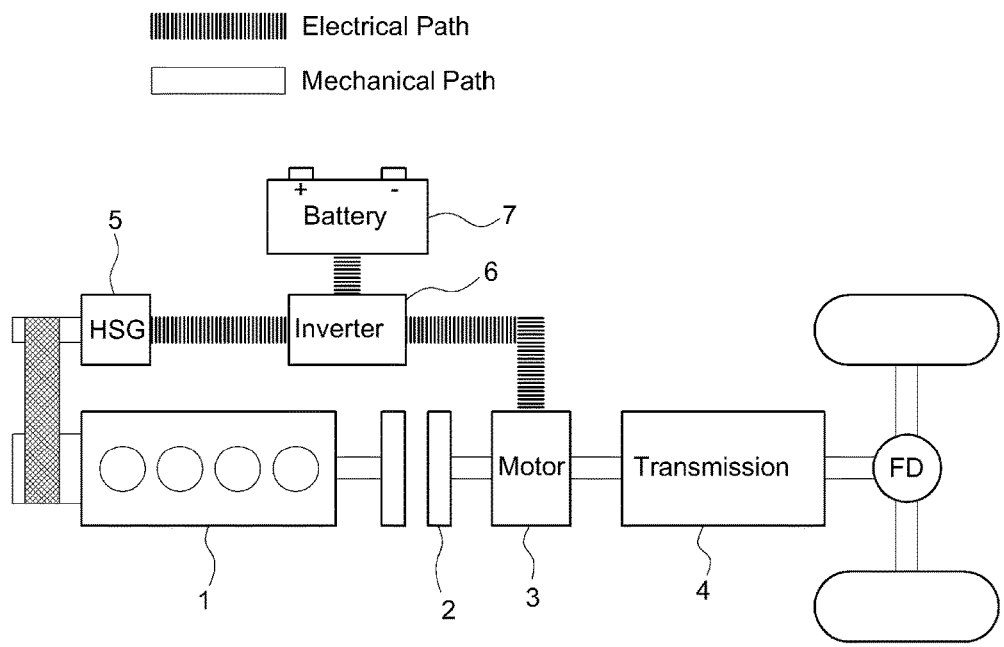
FIG. 1 is a view illustrating a configuration of a power train of a general hybrid vehicle according to the related art.

Reference numerals set forth in the Drawings includes reference to the following elements as further discussed below.

1: engine
2: engine clutch
3: motor
4: transmission
5: hybrid starter-generator (HSG)
6: inverter
7: battery
10: driving information detecting unit
11: accelerator pedal sensor
12: vehicle speed detecting unit
20: gradient detecting unit
30: motor speed detecting unit
40: controller
41: vehicle control unit (HCU)
42: motor control unit (MCU)
43: transmission control unit (TCU)
44: battery control unit (BMS)
50: engine clutch It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the exemplary embodiment of the present invention will be described more fully with reference to the accompanying drawings, so as to be easily carried out by those skilled in the art.

Figure 2:
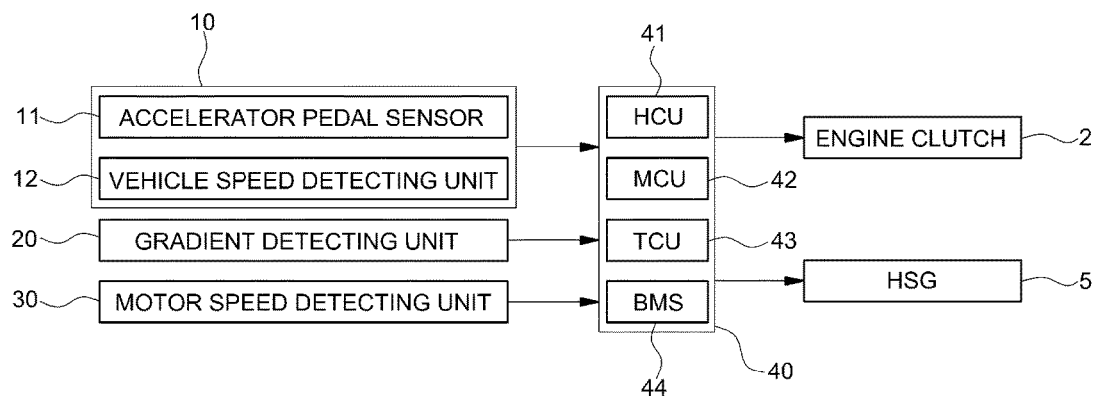
FIG. 2 is a block diagram illustrating a configuration of a driving mode control apparatus according to an exemplary embodiment of the present invention.
Figure 3:
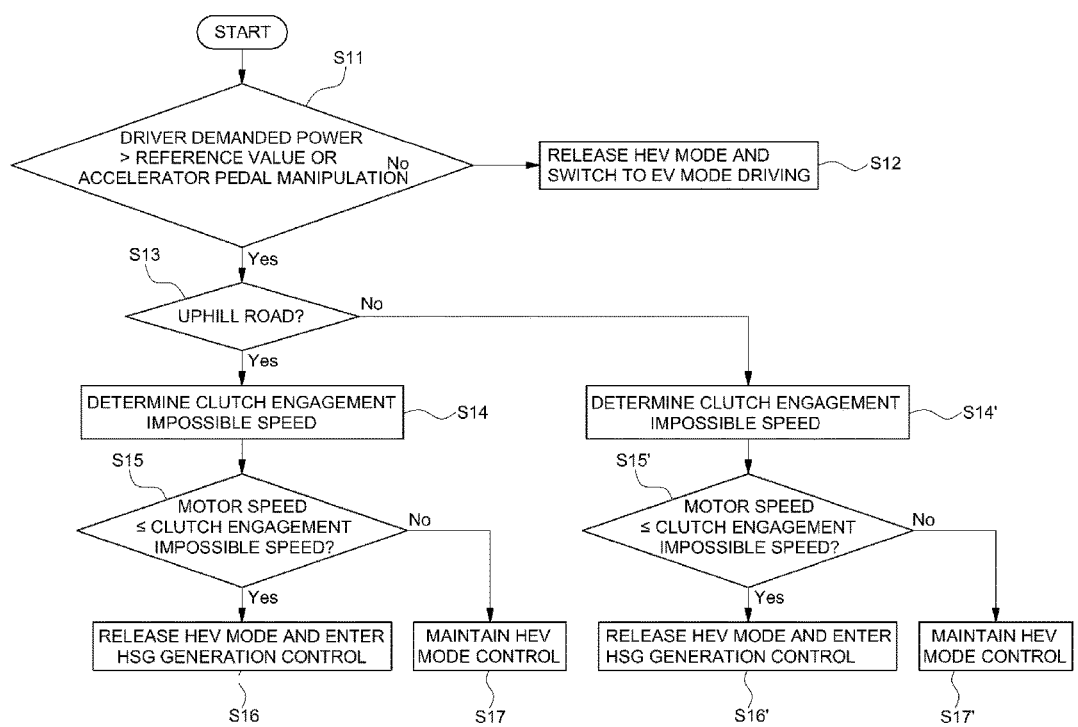
FIG. 3 is a flowchart illustrating a driving mode control process according to an exemplary embodiment of the present invention.

The present invention provides an apparatus and a method for controlling a driving mode of a hybrid vehicle which release an HEV mode at an appropriate time before forcibly releasing an engine clutch even when on an accelerator pedal is engaged (e.g., when pressure is exerted onto the pedal) while driving the vehicle on an uphill road in the HEV mode, thereby reducing a shock or jerk caused when the engine clutch is forcibly disengaged and improving riding comfort and drivability. FIG. 2 is a block diagram illustrating a configuration of a driving mode control apparatus according to an exemplary embodiment of the present invention, and FIG. 3 is a flowchart illustrating a driving mode control process according to an exemplary embodiment of the present invention. In the following description, a configuration of a power train of a hybrid vehicle will be described with reference to FIG. 1.

As illustrated in FIG. 2, a driving mode control apparatus according to an exemplary embodiment of the present invention may include a driving information detecting unit 10 (e.g., a sensor) configured to detect a current driving state of a hybrid vehicle, a gradient detecting unit 20 (e.g., a sensor) configured to detect a gradient of a road, a motor speed detecting unit 30 (e.g., a sensor) configured to detect a speed of a motor, a vehicle controller (e.g., HCU: hybrid control unit) 41, a motor control unit (MCU) 42, a transmission control unit (TCU) 43, and a battery control unit (BMS) 44. The vehicle controller may be configured to operate the other various units of the apparatus.

The driving information detecting unit 10 may include an accelerator pedal position sensor (APS) 11 and a vehicle speed detecting unit 12 and may be configured to output a detected signal to the vehicle controller 41 via a network. Therefore, the vehicle controller 41 may be configured to calculate a driver demanded power from information, such as a gear stage, transmitted from the transmission controller 43 via a network, in addition to driving state information detected by the driving information detecting unit 10, that is, a vehicle speed and an accelerator pedal position and determine a driving mode of the vehicle based on the calculated driver demanded power.

The gradient detecting unit 20 may be configured to detect a gradient of a road (e.g., a slope of the road) on which the vehicle is driven and in the present invention, the road gradient detected by the gradient detecting unit 20 may be used to determine whether the vehicle is driven on an uphill road and to determine a clutch engagement impossible speed, which will be described below. The gradient detecting unit 20 may include an acceleration sensor and a process of obtaining the road gradient using a signal value of the acceleration sensor is well known in the art and thus a detailed description thereof will be omitted.

The motor speed detecting unit 30 may be configured to detect a motor speed (RPM) while driving the vehicle and in the present invention, a motor speed which is detected by the motor speed detecting unit 30 is compared with the clutch engagement impossible speed (RPM) determined based on the road gradient to determine whether to maintain or release the HEV mode in the vehicle controller 41. The vehicle controller 41 may be a top level controller (e.g., an upper controller) and may be configured to operate lower level controllers connected to the vehicle controller via a network and may be configured to collect information from the lower level controllers to operate the hybrid vehicle.

In the present invention, the vehicle controller 41 may be configured to release the HEV mode and switch the mode to an EV mode or maintain the HEV mode based on a driver demanded power or whether an accelerator pedal is manipulated (e.g., whether pressure is exerted onto the pedal) while driving the vehicle in the HEV mode. When the vehicle is driven on the uphill road in the HEV mode, the vehicle controller 41 may be configured to release the HEV mode and switch the mode to the HSG generation control mode or maintain the HEV mode based on the motor speed and the clutch engagement impossible speed.

The motor controller 42 may be configured to operate of the motor 3 and the HSG 5. In particular, the motor controller 42 may be configured to adjust the electricity generation of the HSG 5, together with the vehicle controller 41 and the battery controller 44. The transmission controller 43 may be configured to operate the transmission 4 based on a control signal of the vehicle controller 41 connected thereto via a network and may also be configured to execute engaging and releasing (separating) operations of the engine clutch 2.

Further, the battery controller 44 may be configured to operate the battery to be charged or discharged and collect battery state information to provide the information to the vehicle controller 41 and adjust the electricity generation of the HSG 5 through cooperative control with the vehicle controller 41 and the motor controller 42.

Hereinafter, in the exemplary embodiment of the present invention, the vehicle controller 41, the motor controller 42, the transmission controller 43, and the battery controller 44 may collectively be referred to as controllers. Further, a driving mode control process according to an exemplary embodiment of the present invention will be described with reference to FIG. 3.

First, the controller 40 may be configured to calculate a driver demanded power from a current driving state of the vehicle detected by the driving information detecting unit 10. In particular, the controller 40 may be configured to calculate the driver demanded power using information such as an accelerator pedal position (e.g., an APS value) detected by the accelerator pedal sensor 11, a current vehicle speed detected by the vehicle speed detecting unit 12, and a gear stage received from the transmission controller 43 and the process of calculating the driver demanded power is well known in the art and thus, a detailed description thereof will be omitted.

Additionally, when the driver demanded power is equal to or less than a reference value while driving the vehicle in the HEV mode and it is determined that the accelerator pedal is not manipulated (e.g., accelerator pedal is disengaged) by the accelerator pedal sensor 11, the controller 40 may be configured to release the HEV mode and switch a driving mode to drive the vehicle in the EV mode in steps S11 and S12. In particular, the controller 40 may be configured to disengage the engine clutch 2 to transmit the power of the motor 2 to a driving wheel.

In the above description, even though the mode is switched to the EV mode when the driver demanded power is equal to or less than a reference value and the accelerator pedal is disengaged, any one of the conditions in which the driver demanded power is equal to or less than a reference value and the accelerator pedal is disengaged may be applied. The reference value may be a value determined based on a vehicle driving state, among values of a reference power line and the reference power line whose reference value is set based on the vehicle driving state may be stored in advance in a memory of the controller 40.

When while driving the hybrid vehicle in the HEV mode, the driver demanded power may be decreased to reach the reference power line value or the accelerator pedal is disengaged (e.g., pressure is not exerted onto the accelerator pedal), the HEV mode may be switched to the EV mode. The process of switching a mode between the HEV mode and the EV mode based on the driver demanded power and whether to manipulate the accelerator pedal is well known in the art.

However, in the present invention, even though during the HEV mode driving, the driver demanded power does not reach the reference power line but is greater than a value of the reference power line, that is, the reference value and the accelerator pedal is engaged, the HEV mode may be released when the conditions which will be described below are satisfied. In particular, in a condition in which during the HEV mode driving, the driver demanded power is greater than the reference value and the accelerator pedal is continuously engaged (e.g., the accelerator pedal is maintained to be manipulated), the controller may be configured to determine whether the vehicle is driven on the uphill road from the detected information of the gradient detecting unit 20 in step S13.

Particularly, in response to determining that the vehicle is driven on the uphill road, a clutch engagement impossible speed (RPM) may be determined from the gradient of the currently driven road, that is, the road gradient detected by the gradient detecting unit 20 in step S14. Accordingly, the clutch engagement impossible speed may be set in advance based on the road gradient and stored in the controller 40. When the road gradient is greater, a clutch engagement impossible speed may be set to be greater.

In the above description, when the driver demanded power is greater than the reference value or the accelerator pedal is engaged, step S13 of determining whether the vehicle is driven on the uphill load and subsequent steps may be performed, but any one of the conditions in which the driver demanded power is greater than the reference value and the accelerator pedal is manipulated may be applied.

As described above, when the clutch engagement impossible speed (RPM) is determined as a value based on the road gradient, the controller 40 may be configured to compare the motor speed (RPM) detected by the motor speed detecting unit 30 with the determined clutch engagement impossible speed in step S15. When the motor speed is equal to or less than the clutch engagement impossible speed, the controller 40 may be configured to disengage the engine clutch 2 to release the HEV mode and adjust the HSG electricity generation when the HEV mode is released in step S16. In particular, while the HSG electricity generation is performed when the engine clutch 2 is disengaged, the HSG 5 may be configured to operate as a generator by the power of the engine 1 and the battery 7 may be charged by electric energy generated in the HSG 5.

When the motor speed is greater than the clutch engagement impossible speed, the HEV mode state may be maintained in step S17. In response to determining that the road on which the vehicle is driven is not the uphill road, but a substantially flat road or a downhill load in step S13, steps S14' to S17' may be performed. In particular, the clutch engagement impossible speed may be set to be less than the above-described clutch engagement impossible speed which may be determined based on the gradient of the uphill road.

In the exemplary embodiment of the present invention, as illustrated in FIG. 2, even when the vehicle is driven on the substantially flat road or the downhill road, the clutch engagement impossible speed may be determined in step S14' and the motor speed may be compared with the clutch engagement impossible speed in step S15', and thus, when the motor speed is equal to or less than the clutch engagement impossible speed, a logic may be set to perform the HEV mode release control and the HSG electricity generation control in step S16'. However, when the accelerator pedal is engaged on the flat road or the downhill road, the vehicle speed may be minimally reduced and the motor speed may be minimally reduced to be equal to or less than the clutch engagement impossible speed.

In other words, when the vehicle is driven on the flat road or the downhill road, the driver demanded power is greater than the reference power line value (reference value), or the accelerator pedal is engaged, the motor speed may not reach the clutch engagement impossible speed, and thus, the HEV mode control state may be maintained. Accordingly, even though a driver demanded power does not reach a reference power line value or the accelerator pedal is engaged while the vehicle is driven on an uphill road in an HEV mode, when a motor speed is equal to or less than a clutch engagement impossible speed, HSG generation control may be performed simultaneously with the HEV mode release control or after releasing the HEV mode, to prevent the power of the engine from being transmitted to a driving shaft and to use the power of the engine for HSG generation.

As a result, according to the present invention, before reaching the forcible releasing condition of the engine clutch, HEV mode release which follows a normal clutch releasing sequence in which the engine clutch is completely disengaged after disengaging an applied hydraulic pressure may be performed to reduce a shock and a jerk caused when the engine clutch is forcibly disengaged and improve the riding comfort and drivability of the vehicle.

In the present invention, as soon as the HEV mode is released, the mode may be switched to the HSG electricity generation control to use the power of the engine to generate electricity of the HSG and charge the battery, thereby maintaining an appropriate SOC of the battery and securing the SOC balancing.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A driving mode control method of a hybrid vehicle which includes an engine and a motor which drive a vehicle and an engine clutch which connects or disconnects the power between the engine and the motor, the method comprising:
    determining, by a controller, whether the vehicle is driven on an uphill road from gradient information of a current road while the vehicle is driven in a hybrid electric vehicle (HEV) mode;
    determining, by the controller, an HEV mode release reference speed that corresponds to the gradient of the current road in response to determining that the vehicle is driven on the uphill road; and
    disengaging, by the controller, the engine clutch to release the HEV mode when the speed of the motor is equal to or less than the determined HEV mode release reference speed,
    wherein the HEV mode release reference speed is set to be higher as a gradient of the road increases.

2. The control method of claim 1, further comprising:
    performing, by the controller, generation control to operate a hybrid starter generator to generate electricity by an engine power when the HEV mode is released to charge a battery.

3. The control method of claim 1, wherein during the HEV mode driving of the vehicle, when the driver demanded power calculated from the current driving state of the vehicle is greater than a reference value determined based on the driving state of the vehicle, whether the vehicle is driven on the uphill road is determined and subsequent steps are performed.

4. The control method of claim 3, wherein when the driver demanded power is equal to or less than the reference value, the engine clutch is disengaged to release the HEV mode and switch the mode to an electric vehicle (EV) mode driving.

5. The control method of claim 1, wherein during the HEV mode driving of the vehicle, when the accelerator pedal is maintained to be engaged, whether the vehicle is driven on the uphill road is determined and subsequent steps are performed.

6. The control method of claim 1, wherein during the HEV mode driving of the vehicle, when the driver demanded power calculated from the current driving state of the vehicle is greater than a reference value determined based on the driving state of the vehicle or the accelerator pedal is maintained to be engaged, whether the vehicle is driven on the uphill road is determined and subsequent steps are performed.

7. The control method of claim 6, wherein when the driver demanded power is equal to or less than the reference value and the accelerator pedal is disengaged, the engine clutch is disengaged to release the HEV mode and to switch the mode to an electric vehicle (EV) mode driving.

8. The control method of claim 1, wherein when a speed of the motor is greater than the determined HEV mode release reference speed, the HEV mode driving of the vehicle is maintained.

9. The control method of claim 1, wherein in response to determining that the road on which the vehicle is driven is a flat road or a downhill road, the HEV mode driving of the vehicle is maintained.

10. The control method of claim 9, wherein in response to determining that the road on which the vehicle is driven is a flat road or a downhill road, when the speed of the motor is greater than the HEV mode release reference speed, the HEV mode driving of the vehicle is maintained and the HEV mode release reference speed in this case is set to be less than the HEV mode release reference speed set based on the gradient of the road to be compared with the speed of the motor in an uphill road driving condition of the vehicle.

11. A driving mode control apparatus of a hybrid vehicle which includes an engine and a motor which drive a vehicle and an engine clutch which connects or disconnects the power between the engine and the motor, the apparatus comprising:
    a gradient detecting unit configured to detect a gradient of a road on which the vehicle is driven;
    a motor speed detecting unit configured to detect a speed of the motor; and a controller configured to release or maintain a hybrid electric vehicle (HEV) mode control based on the detected speed of the motor in response to determining that the vehicle is driven on the uphill road from the detected gradient information of the road during the HEV mode driving of the vehicle, wherein during uphill road driving of the vehicle, the controller is configured to determine an HEV mode release reference speed that corresponds to the gradient of a current road and when the speed of the motor is equal to or less than the determined HEV mode release reference speed, the controller is configured to disengage the engine clutch to release the HEV mode, and wherein the HEV mode release reference speed is set to be higher as a gradient of the road increases.

12. The control apparatus of claim 11, wherein the controller is configured to perform generation control which operates a hybrid starter generator to generate electricity by an engine power when the HEV mode is released to charge a battery.

13. The control apparatus of claim 11, wherein during HEV mode driving of the vehicle, when driver demanded power calculated from a current driving state of the vehicle is greater than a reference value determined based on the driving state of the vehicle, the controller is configured to determine the HEV mode release reference speed that corresponds to the gradient of a current road when the vehicle is driven on the uphill road and compare the speed of the motor with the determined HEV mode release reference speed to release the HEV mode or maintain the HEV mode control.

14. The control apparatus of claim 11, wherein during HEV mode driving of the vehicle, when the accelerator pedal is maintained to be engaged, the controller is configured to determine the HEV mode release reference speed that corresponds to the gradient of a current road when the vehicle is driven on the uphill road and compare the speed of the motor with the determined HEV mode release reference speed to release the HEV mode or maintain the HEV mode control.

15. The control apparatus of claim 11, wherein during HEV mode driving of the vehicle, when driver demanded power calculated from a current driving state of the vehicle is greater than a reference value determined based on the driving state of the vehicle or the accelerator pedal is maintained to be manipulated by the driver, the controller is configured to determine the HEV mode release reference speed that corresponds to the gradient of a current road when the vehicle is driven on the uphill road and compare the speed of the motor with the determined HEV mode release reference speed to release the HEV mode or maintain the HEV mode control.

16. The control apparatus of claim 11, wherein when a speed of the motor is greater than the determined HEV mode release reference speed, the controller is configured to maintain the HEV mode driving of the vehicle.

* * * * *